United States Patent
Hert et al.

(10) Patent No.: US 10,781,860 B2
(45) Date of Patent: Sep. 22, 2020

(54) SELF-ALIGNING ROLLER BEARING HAVING IMPROVED LUBRICANT DISCHARGE, PREFERABLY FOR AN AIRCRAFT TURBOJET ENGINE SPEED REDUCER

(71) Applicant: Safran Transmission Systems, Colombes (FR)

(72) Inventors: Xavier Paul Lucien Hert, Moissy-Cramayel (FR); Aldric Renaud Gabriel Marie Moreau De Lizoreux, Moissy-Cramayel (FR); Boris Pierre Marcel Morelli, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/483,914

(22) PCT Filed: Feb. 6, 2018

(86) PCT No.: PCT/FR2018/050286
§ 371 (c)(1),
(2) Date: Aug. 6, 2019

(87) PCT Pub. No.: WO2018/146410
PCT Pub. Date: Aug. 16, 2018

(65) Prior Publication Data
US 2019/0390711 A1   Dec. 26, 2019

(30) Foreign Application Priority Data

Feb. 9, 2017 (FR) ...................................... 17 51081

(51) Int. Cl.
*F16C 33/66* (2006.01)
*F16C 19/38* (2006.01)
(Continued)

(52) U.S. Cl.
CPC ........ *F16C 33/6681* (2013.01); *F16C 23/086* (2013.01); *F16C 33/485* (2013.01);
(Continued)

(58) Field of Classification Search
CPC .... F16C 19/38; F16C 23/086; F16C 33/4676; F16C 33/485; F16C 33/581; F16C 33/6681; F16C 2326/43; F16C 2361/61
See application file for complete search history.

(56) References Cited

U.S. PATENT DOCUMENTS

2018/0195601 A1 * 7/2018 Hallman ................. F16C 25/08

FOREIGN PATENT DOCUMENTS

FR          3029246 A1    6/2016
JP       H08-177869 A    7/1996
(Continued)

OTHER PUBLICATIONS

Machine Translation of JP-2001208075-A (Year: 2001).*
(Continued)

*Primary Examiner* — Alan B Waits
(74) *Attorney, Agent, or Firm* — Pearne & Gordon LLP

(57) ABSTRACT

The invention relates to a self-aligning roller bearing, comprising a rotary outer ring exhibiting a spherical raceway, the bearing comprising first and second annular rows of rollers respectively associated with first and second rotary cages that hold the rollers in place. According to the invention, the first cage has an exterior surface equipped with at least one deflector for discharging lubricant towards a first side of the bearing, in a first axial direction extending from the second cage towards the first cage, this deflector extending, in a second axial direction that is the opposite of the first direction, beyond the rollers associated with the first cage and also beyond the first cage so as to cover part of the second cage.

8 Claims, 4 Drawing Sheets

(51) Int. Cl.
*F16C 23/08* (2006.01)
*F16C 33/48* (2006.01)
F16C 33/46 (2006.01)
F16C 33/58 (2006.01)

(52) U.S. Cl.
CPC .......... *F16C 19/38* (2013.01); *F16C 33/4676* (2013.01); *F16C 33/581* (2013.01); *F16C 2326/43* (2013.01); *F16C 2361/61* (2013.01)

(56) References Cited

FOREIGN PATENT DOCUMENTS

| JP | 2001208075 A | * | 8/2001 | ............ F16C 33/495 |
|---|---|---|---|---|
| JP | 2001208075 A | | 8/2001 | |
| JP | 2005321047 A | | 11/2005 | |

OTHER PUBLICATIONS

Search Report issued in French Patent Application No. 1751081 dated Sep. 28, 2017.
International Search Report issued in Application No. PCT/FR2018/050286 dated May 14, 2018.
Written Opinion issued in Application No. PCT/FR2018/050286 dated May 14, 2018.

* cited by examiner

SELF-ALIGNING ROLLER BEARING HAVING IMPROVED LUBRICANT DISCHARGE, PREFERABLY FOR AN AIRCRAFT TURBOJET ENGINE SPEED REDUCER

This is the National Stage application of PCT international application PCT/FR2018/050286, filed on Feb. 6, 2018 entitled "SELF-ALIGNING ROLLER BEARING HAVING IMPROVED LUBRICANT DISCHARGE, PREFERABLY FOR AN AIRCRAFT TURBOJET ENGINE SPEED REDUCER", which claims the priority of French Patent Application No. 17 51081 filed Feb. 9, 2017, both of which are incorporated herein by reference in their entirety.

TECHNICAL FIELD

The present invention relates to the field of roller ball bearings. This type of bearing generally comprises two rows of rollers, so-called spherical rollers, as well as a spherical rolling track provided on an outer ring of the bearing.

The invention relates more particularly to the discharge of lubricant outside this type of bearing, the concave shape of the spherical outer rolling track of which promotes retention of the lubricant.

The invention applies preferably to a speed reducer for an aircraft turboprop engine.

STATE OF THE PRIOR ART

In addition to the above-mentioned elements, a ball-and-socket bearing has two rolling tracks that are inclined in relation to the axis of the bearing, said two spherical tracks being formed on an inner ring of the bearing. The centre of the sphere of the outer track is at the bearing axis. The bearing thus has self-aligning capability and remains tolerant to misalignment of the shaft relative to the bearing, caused by, for example, shaft bending. This type of bearing is used in particular for supporting heavy radial loads as well as heavy axial loads, in both directions. It is thus perfectly adapted for implantation in a speed reducer of an aircraft turbine engine, but is more generally adapted to any type of mechanical assembly in which the outer bearing ring is in rotation.

One of the difficulties associated with this type of bearing lies in the discharge of the lubricant, which is generally introduced from the inside through holes passing through the inner ring. After the rollers are lubricated, the lubricant is trapped due to centrifugal force in the recess of the spherical rolling track. Thus, in order to allow the trapped lubricant to be discharged, holes are usually made in the outer ring which forms this rolling track.

However, these lubricant discharge holes through the outer ring considerably weaken the ring, which is subjected to many diverse and repeated stresses such as the passage of the rollers, or the centrifugal effect as a result of the rotation thereof. Furthermore, when the outer ring is integrated with a gear wheel such as a planet gear of an epicyclic gear train, the engagement of this planet gear with other toothed elements further increases the stresses that the outer bearing ring undergoes. It therefore becomes fragile in fatigue, and needs to be oversized, to the detriment of its mass.

SUMMARY OF THE INVENTION

In order to at least partially solve the disadvantages of the prior art embodiments, the invention firstly relates to a ball-and-socket bearing according to the features of claim 1.

In operation, the invention astutely takes advantage of the rotational speed differential between the rotating outer ring, and the first rotary cage. This speed differential makes it possible to move the lubricant around the axis of the bearing, in the space defined between the outer ring and the first cage. When it occurs, this flow of lubricant then encounters the baffle(s) which discharge at least a part of said flow out of the bearing, to one side thereof.

This way of conducting the discharge of the lubricant makes it possible to dispense with the discharge holes in the outer ring of the bearing. Manufacturing thereof is facilitated, and fatigue strength improved. Furthermore, the outer ring no longer needs to be oversized, which advantageously generates a non-negligible mass gain.

In addition, the baffle extends in the second axial direction beyond the first cage, so as to cover a portion of the second cage. This arrangement makes it possible to collect even more lubricant. Further, the height of lubricant trapped in the outer track is lower away from the centre of said track, which is better for bearings with large misalignment.

The invention preferably provides at least one of the following optional features, taken separately or in combination.

Said baffle also extends between two directly consecutive rollers in a circumferential direction of the first cage, in order to further channel the lubricant better towards the side of the bearing to be extracted therefrom.

For the same purpose, said baffle extends in the first axial direction to the end of the first cage at the first side of the bearing. This makes it possible to better channel the lubricant, until it is extracted towards the side of the bearing.

Each baffle preferably has a lubricant deflection surface parallel to an axis of the bearing, or inclined in a circumferential direction such that its two opposite axial ends are offset from each other in the circumferential direction. In the latter case, a ramp shape can also be envisaged for the deflection surface, without departing from the scope of the invention. Thus, this deflection surface is not necessarily planar.

The subject of the invention is also a speed reducer for driving a propeller of an aircraft turboprop engine, said reducer comprising an epicyclic gear train comprising at least one ball bearing as described above, associated with one of the planet gears of the epicyclic gear train.

More preferably, the epicyclic gear train comprises:
a fixed ring gear;
planet gears;
a planet gear carrier;
a sun gear; and
at least one ball bearing associated with one of the planet gears so that a hub of the planet gear constitutes said rotating outer ring of the bearing.

Finally, the invention relates to an aircraft turboprop engine comprising such a speed reducer, with said planet gear carrier or said sun gear driving the propeller of the turboprop engine.

Other advantages and characteristics of the invention will become apparent from the following detailed non-limiting description.

BRIEF DESCRIPTION OF THE DRAWINGS

This description will be given with regard to the appended drawings, among which.

DETAILED DESCRIPTION OF PREFERRED EMBODIMENTS

Figure 1:
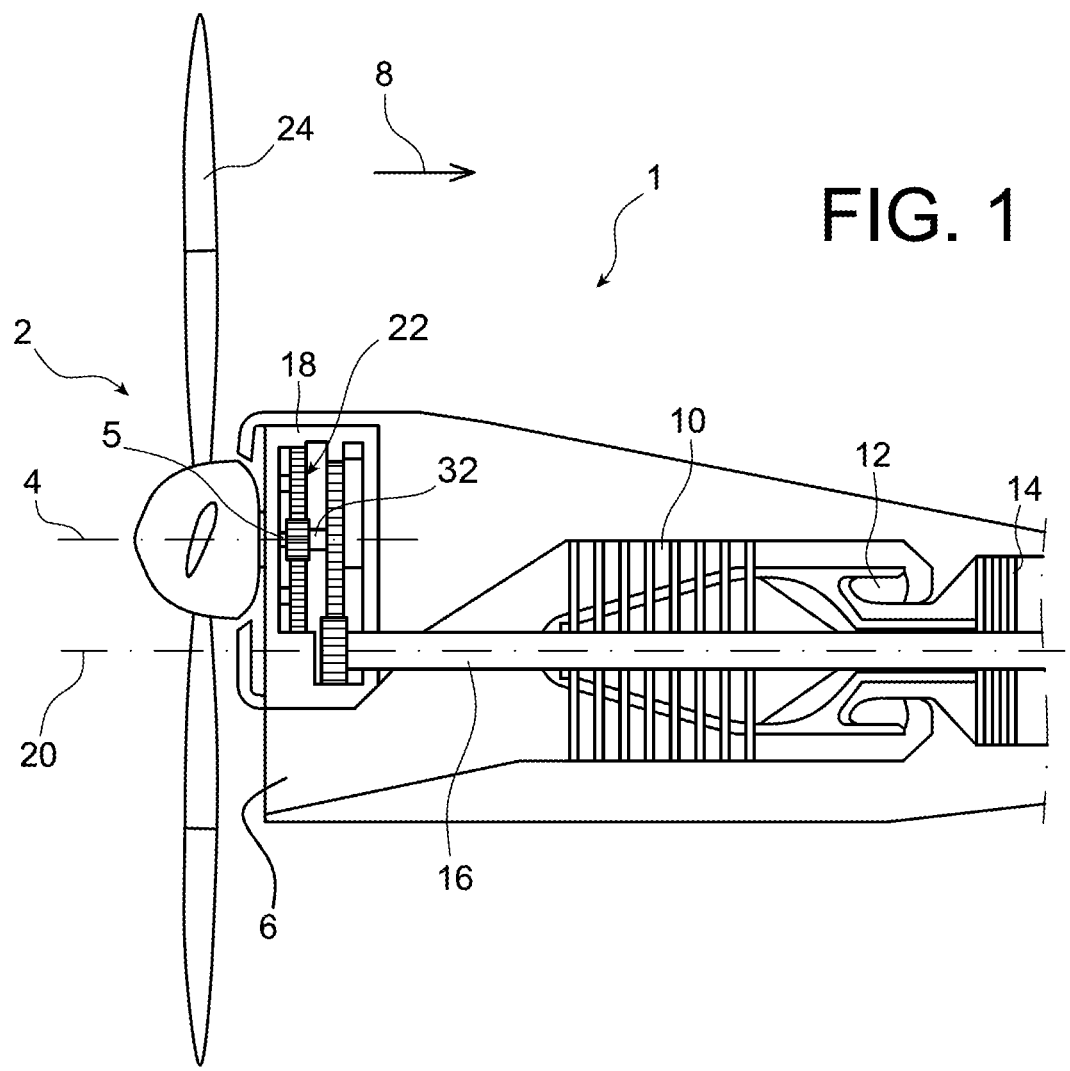
FIG. 1 represents a schematic side view of an aircraft turboprop engine according to the invention.

Referring first to FIG. 1, a turboprop engine 1 for an aircraft is shown, according to the present invention. The turboprop engine comprises, in a conventional manner, a propeller 2 which can be rotated about a rotation axis 4, on which a propeller shaft 5 is centred. The speed of the propeller 2 is preferably on the order of 1000 to 1500 rpm, and an output torque on the order of 30 kNm At the downstream side of the propeller 2, the turboprop engine 1 comprises an air inlet 6, located, for example, vertically below the axis of rotation 4 of the propeller. In this regard, it is noted that throughout the description, the terms upstream and downstream are used with reference to a main direction of air flow through the propeller 2, this direction being parallel to the axis 4 and shown schematically by the arrow 8 in FIG. 1

The air inlet 6 supplies air to a compressor or a group of compressors 10, downstream of which there is a combustion chamber. The gases from the combustion are expanded in a turbine or a group of turbines 14, which drives a drive shaft or a group of shafts 16. This shaft 16 is at a distance and parallel to the propeller shaft 5 and drives a speed reducer 18 which in turn drives the propeller shaft 5. The drive shaft 16, the group of compressors 10, the combustion chamber 12 and the group of turbines 14 are centred on an axis 20 parallel to the axis of rotation 4 of the impeller 2, the air inlet 6 being vertically below this axis 20.

Figure 2:
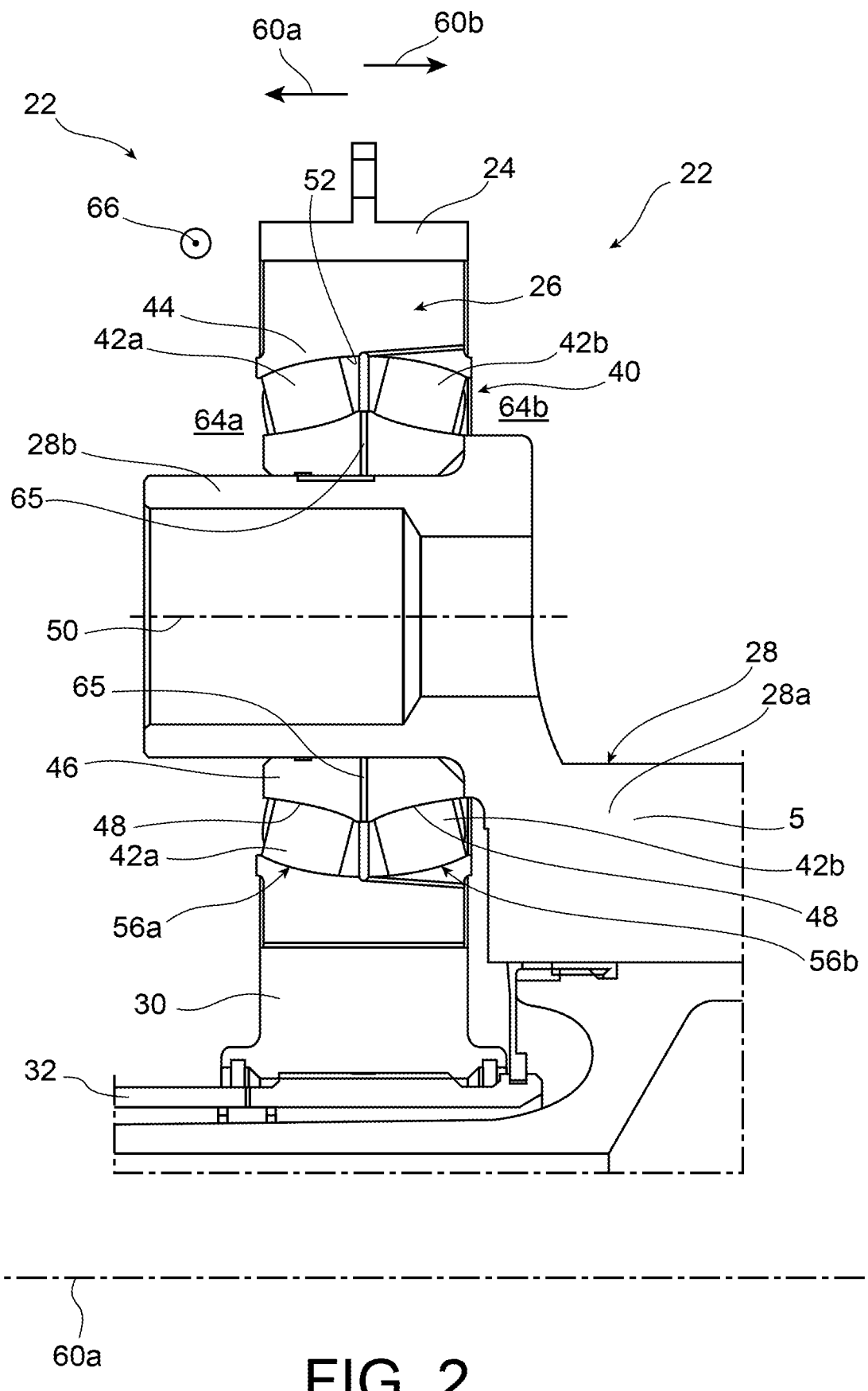
FIG. 2 shows an enlarged view in axial half-section of the epicyclic gear train shown in the preceding figure.
Figure 3:
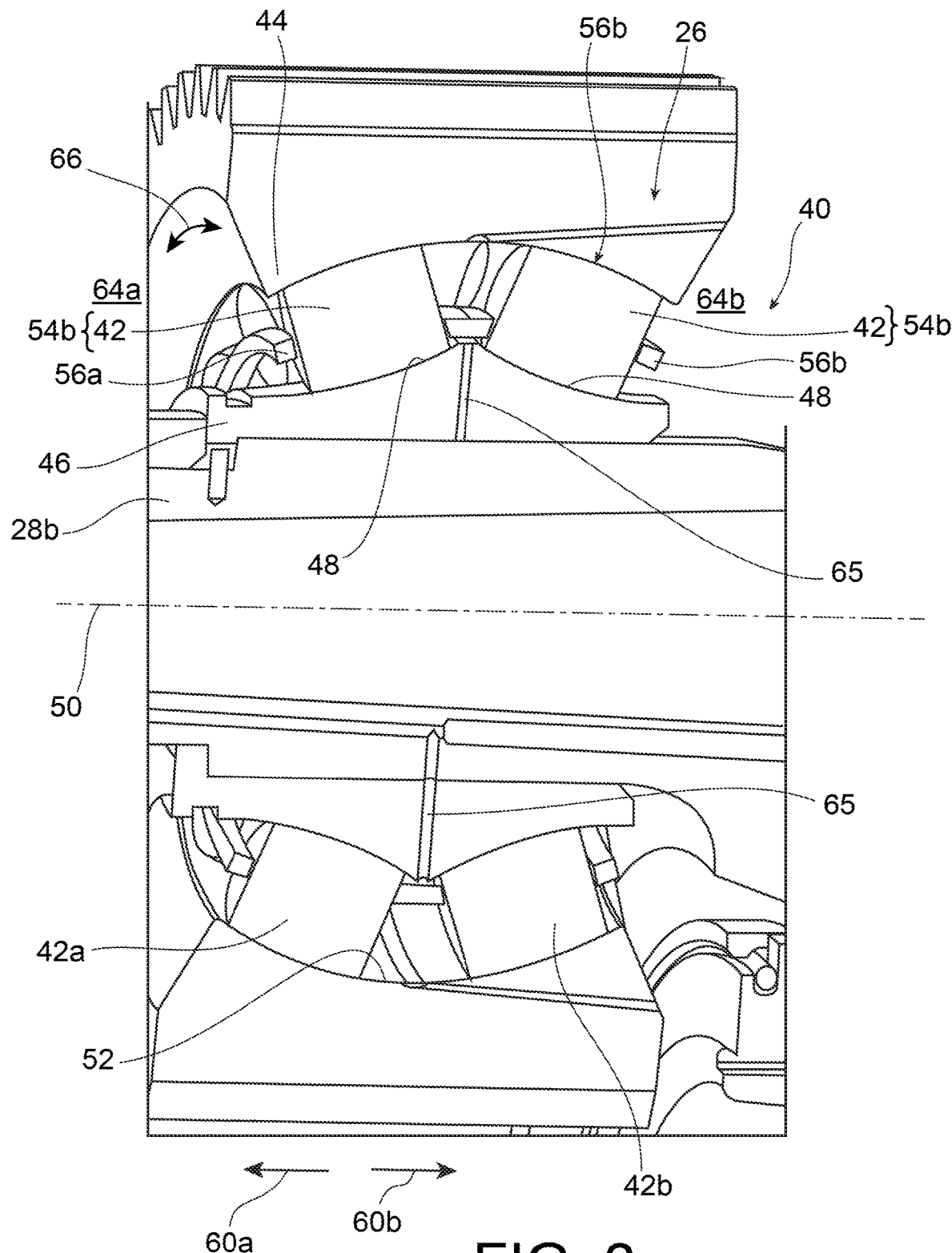
FIG. 3 shows a perspective partial view of a planet gear of the epicyclic gear train shown in the preceding figure, the planet gear being associated with a bearing specific to the invention.
Figure 4:
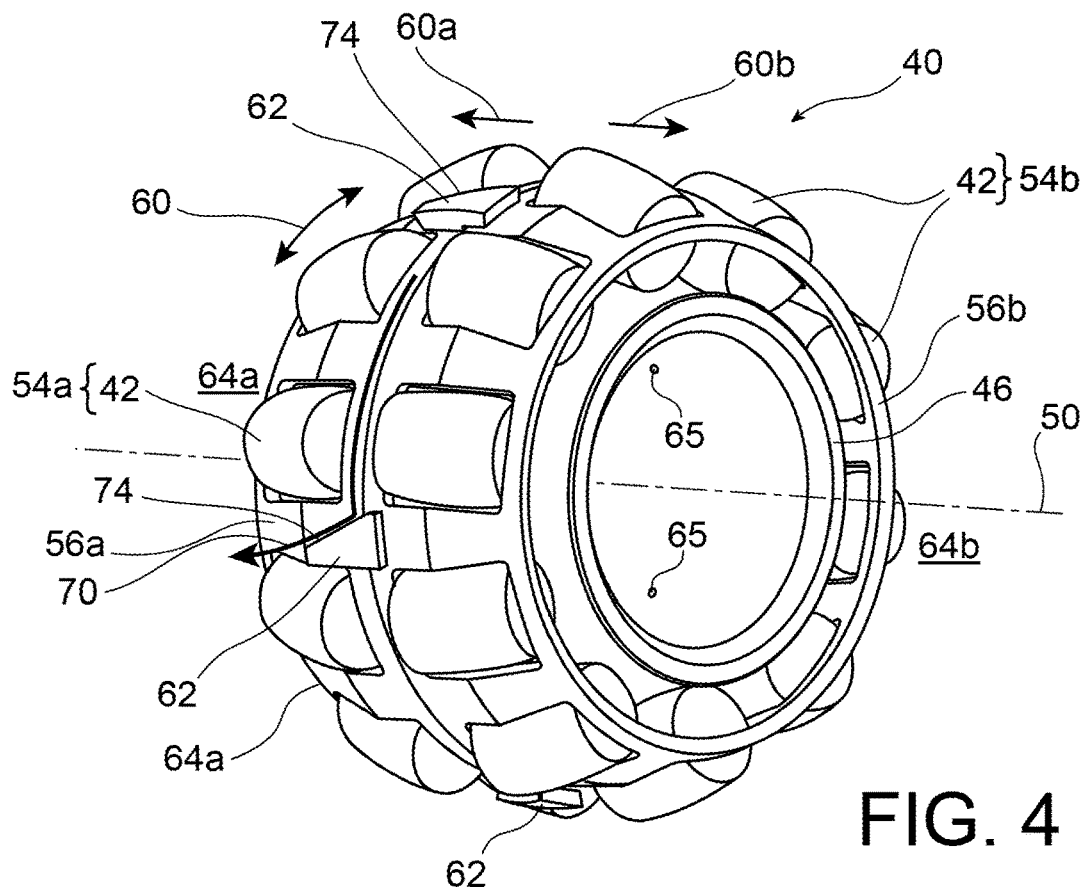
FIG. 4 is a perspective view of the inner part of the bearing shown in the preceding figure.

The speed reducer 18, also referred to as a gearbox, corresponds to a gear box comprising in particular an epicyclic gear train 22, which will be detailed with reference to FIG. 2.

The epicyclic gear train 22 first comprises a fixed ring 24, internally toothed and centred on the axis 4. This fixed ring 24 meshes with planet gears 26 provided, for example, in a number between 3 and 6. The planet gears 26 are supported by a planet gear carrier 28 centred on the axis 4. Furthermore, the train 22 comprises a sun gear 30 also centred on the axis 4 and meshing with the planet gears 26. In this configuration, a sun gear shaft 32 centred on the axis 4 is epicyclic which is itself driven in rotation by other elements of the reducer. The ring 24 is part of a stator of the turboprop engine, and preferably forms the casing of the speed reducer. The hub 28a of the planet gear carrier is connected and secured in rotation to the propeller shaft 5, so as to drive the impeller in rotation. Nevertheless, other arrangements are possible, for example by causing the propeller to be driven not by the planet gear carrier 28, but by the sun gear shaft 32.

To ensure the rotation of the planet gears on the fingers 28b of the planet gear carrier, bearings 40 specific to the invention are provided. These are roller bearings, also referred to as ball bearings. One of these bearings will now be described with reference to FIGS. 2 to 5

The bearing 40 is a ball-and-socket bearing on rollers 42. These rollers are referred to as spherical rollers. The rollers 42 are clamped between a rotating outer ring 44, and an inner ring 46 integral in rotation with the finger 28b of the planet gear carrier. The inner ring 46 externally defines two rolling tracks 48, inclined relative to the axis of the bearing 50, On the other hand, a spherical rolling track 52 is provided on the inside of the outer ring 44 of the bearing. The centre of the sphere of the outer rolling track is at the bearing axis. Here, this outer ring 44 has the particularity of being an integral part of the planet gear 26, forming the hub of the latter. In other words, the hub/rim of the planet gear is made in one piece with the rest of said planet gear.

The bearing 40 has a first annular row 54a of rollers 42 held relative to one another by a first rotary cage 56a. The cage 56a is centred on the rolling axis 50, and has through-holes in which the rollers are housed. Similarly, the bearing 40 has a second annular row 54b of rollers 42 held therebetween relative to each other by a second rotary cage 56b.

In the rest of the description, two opposite axial directions are defined, both parallel to the rolling axis 50. First, a first axial direction 60a extends from the second cage 56b to the first cage 56a, and a second opposite axial direction 60b, from the first cage 56a to the second cage 56b.

One of the features of the invention lies in the presence, on the outer surface of the first cage 56a, of one or more baffles 62 arranged to allow the discharge of lubricant in the first axial direction 60a, towards a first side 64a of the bearing. The number of baffles 62, visible in FIGS. 4 and 5, may vary as needed. A baffle 62 can be arranged between each pair of two directly consecutive rollers 42 in the circumferential direction 66 of the bearing, or only between some of these pairs. In the embodiment shown, there are between 4 and 6 baffles, distributed regularly all around the cage.

Each baffle 62 therefore preferably extends between two directly consecutive rollers 42, but also extends in the second axial direction 60b past these two rollers. In operation, the lubricant is introduced radially through holes 65 passing through the inner ring 46, after having lubricated the rollers 42, the lubricant is centrifugally directed into the recess of the spherical rolling track 52. However, the outer ring 44 rotates at a speed that is that of its associated planet gear, and greater than that of the cage. By way of indication, the first cage 56a rotates 1.5 to 2 times less quickly than the planet gear 26 thus advantageously takes advantage of the rotational speed differential between the rotating outer ring 44 and the first rotary cage 56a, to create a lubricant movement about the axis of the bearing 50 in the space defined between the outer ring 44 and the first cage 56a. When this lubricant flow 70, shown schematically in FIG. 4, occurs, it then encounters the baffles 62 which divert this flow in the first axial direction 60a, thereby making it possible to discharge at least a part of this flow 70 outside the bearing 22, by its first side 64a.

Figure 5:
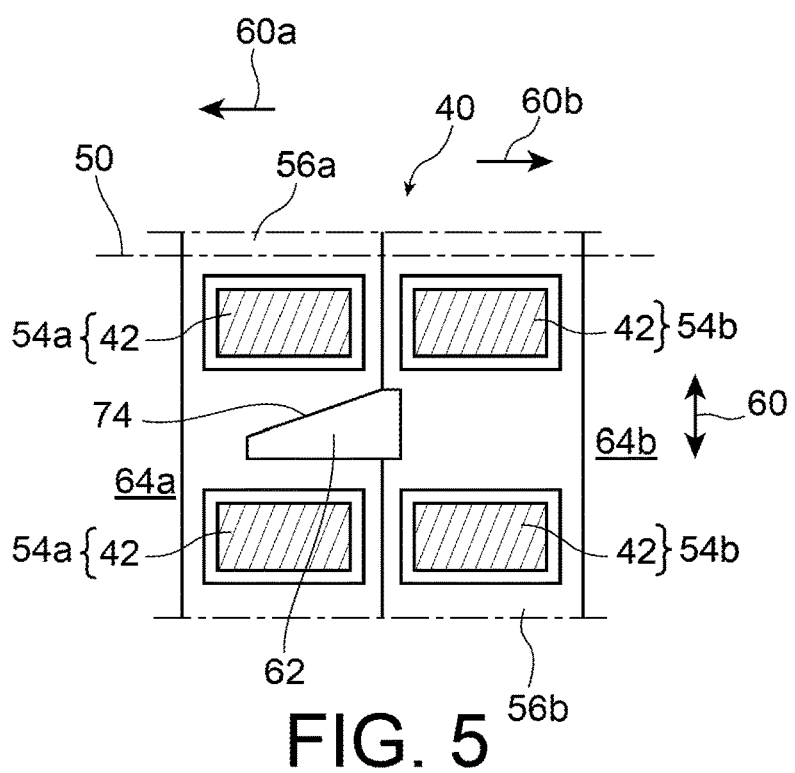
FIG. 5 is a front view of the part of the bearing shown in the preceding figure.
Figure 6:
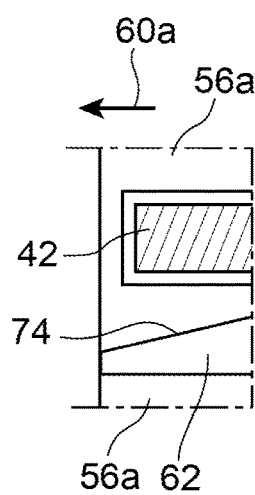
FIG. 6 is a view analogous to that of the previous figure, according to an alternative embodiment.

In FIG. 5, it is shown that the baffle 62 can extend axially, along the first direction 60a, so that its end is located at a distance from the end of the cage in this same first axial direction 60. According to an alternative embodiment shown in FIG. 6, the baffle 62 further extends in the first axial direction 60a such that the axial end thereof is located at the end of the cage, in the same first axial direction 60a. This allows better diversion and channelling of the lubricant flow 70, to the first side 64a of the bearing.

In the second axial direction 60b, the baffle 62 extends beyond the two rollers 42, so as to better capture the lubricant in rotation. Furthermore, to further increase this collection of lubricant, the baffle 62 is also arranged to extend beyond the first cage 56a, to cover a portion of the second cage 56b. Nevertheless, so that this particularity of the invention does not interfere with the rotation of the second cage 56b, the baffle 62 does not extend to the rollers of the second annular row 54b. Still in order to capture a large part of the flow 70, the baffle 62 extends radially to approach as closely as possible the spherical rolling track 52 without coming into contact therewith in order to avoid hindering the kinematics of the bearing.

As is best visible in FIG. 5, the baffle 62 has a lubricant deflection surface 74 inclined in the circumferential direction 66, such that its two opposite axial ends are offset from one another in this same direction 66. The deflection surface 74 is that which is impacted by the lubricant flow 70, when the latter is set in motion between the outer ring 44 and the two cages 56a, 56b. It is flat as shown in FIG. 5, or in the form of a ramp. Alternatively, this deflection surface 74 could be parallel to the rolling axis 50 or only slightly inclined with respect to the latter, without departing from the scope of the invention.

The first bearing cage 56a is preferably produced by additive manufacturing, or by Peek polymer injection. These two techniques are in fact perfectly suitable for obtaining an annular cage comprising radial protuberances from the outer surface thereof, in order to form the baffles 62.

Of course, various modifications may be made by a person skilled in the art to the invention that has just been described, with non-limiting examples.

What is claimed is:

1. A bearing (40) comprising:
   a rotating outer ring (44) having a spherical rolling track (52);
   first and second annular rows (54a, 54b) of rollers (42); and
   first and second rotary cages (56a, 56b) respectively associated with the first and second annular rows (54a, 54b) of rollers (42) for holding said rollers (42), the first and second rotary cages (56a, 56b) being separate and rotatable relative to each other,
   wherein the first cage (56a) has an outer surface provided with at least one baffle (62) for discharging lubricant to a first side (64a) of the bearing (40) in a first axial direction (60a) from the second cage (56b) to the first cage (56a), said baffle (62) extending in a second axial direction (60b) beyond the rollers (42) associated with the first cage (56a), the second axial direction (60b) being opposite the first axial direction (60a), and
   wherein said baffle (62) extends in the second axial direction (60b) also beyond the first cage (56a), so as to cover a portion of the second cage (56b).

2. The bearing (40) according to claim 1, wherein said baffle (62) also extends between two directly consecutive rollers (42) in a circumferential direction (66) of the first cage (56a).

3. The bearing (40) according to claim 2, wherein said baffle (62) extends in the first axial direction (60a) to an end of the first cage (56a) located at a first side (64a) of the bearing (40).

4. The bearing (40) according to claim 1, wherein each baffle (62) has a lubricant deflection surface (74) that is parallel to an axis of the bearing (40) or inclined in a circumferential direction (66), wherein two opposite axial ends of the lubricant deflection surface (74) are offset from each other in the circumferential direction (66) when the lubricant deflection surface (74) is inclined in the circumferential direction (66).

5. A speed reducer (18) for driving a propeller (2) of a turboprop engine (1), comprising:
   an epicyclic gear train (22) comprising a plurality of planet gears (26) and the bearing (40) according to claim 1, the bearing (40) associated with one of the planet gears (26).

6. The speed reducer (18) according to claim 5, wherein the epicyclic gear train (22) further comprises:
   a fixed ring (24);
   planet gears (26);
   a sun gear (30),
   the bearing (40) being associated with the one of the planet gears (26) such that a hub of the one of the planet gears (26) constitutes said rotating outer ring (44) of the bearing (40).

7. An aircraft turboprop engine (1) comprising the speed reducer (18) according to claim 6, wherein the planet carrier (28) or said sun gear (30) drives a propeller (2) of the turboprop engine.

8. A bearing (40) comprising:
   a rotating outer ring (44) having a spherical rolling track (52);
   first and second annular rows (54a, 54b) of rollers (42); and
   first and second rotary cages (56a, 56b) respectively associated with the first and second annular rows (54a, 54b) of rollers (42) for holding said rollers (42),
   wherein the first cage (56a) has an outer surface provided with at least one baffle (62) for discharging lubricant to a first side (64a) of the bearing (40) in a first axial direction (60a) from the second cage (56b) to the first cage (56a), said baffle (62) extending in a second axial direction (60b) beyond the rollers (42) associated with the first cage (56a), the second axial direction (60b) being opposite the first axial direction (60a),
   wherein said baffle (62) extends in the second axial direction (60b) also beyond the first cage (56a), so as to cover a portion of the second cage (56b), and
   wherein said baffle (62) extends in the first axial direction (60a) to an end of the first cage (56a) located at a first side (64a) of the bearing (40).

* * * * *